US006430545B1

(12) United States Patent
Honarvar et al.

(10) Patent No.: US 6,430,545 B1
(45) Date of Patent: Aug. 6, 2002

(54) USE OF ONLINE ANALYTICAL PROCESSING (OLAP) IN A RULES BASED DECISION MANAGEMENT SYSTEM

(75) Inventors: Laurence Honarvar, Arnold, MD (US); Steve Campbell, Manassas; Traci Showalter, Centreville, both of VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/217,016

(22) Filed: Dec. 21, 1998

Related U.S. Application Data

(60) Provisional application No. 60/076,910, filed on Mar. 5, 1998.

(51) Int. Cl.[7] .......................... G06F 17/00; G06F 17/60
(52) U.S. Cl. .......................... 706/47; 707/100; 705/35
(58) Field of Search .......................... 706/47; 707/100; 705/35

(56) References Cited

U.S. PATENT DOCUMENTS

| | | | | |
|---|---|---|---|---|
| 5,905,985 A | * | 5/1999 | Malloy et al. | 707/100 |
| 5,918,232 A | * | 6/1999 | Pouschine et al. | 707/103 |
| 5,926,818 A | * | 7/1999 | Malloy et al. | 707/100 |
| 5,940,818 A | * | 8/1999 | Malloy et al. | 707/2 |
| 5,943,668 A | * | 8/1999 | Malloy et al. | 707/3 |
| 5,978,788 A | * | 11/1999 | Castelli et al. | 707/2 |
| 6,119,103 A | * | 9/2000 | Basch et al. | 705/35 |
| 6,256,676 B1 | * | 7/2001 | Taylor et al. | 709/246 |

FOREIGN PATENT DOCUMENTS

WO    WO01/29690 A2 * 4/2001

OTHER PUBLICATIONS

Kurz et al, "Data Warehousing With Intranet: Prototype of Web–Based. Executive Information System", IEEE. Proceedings of the Eight International Workshop on Database and Expert Systems Applications, Sep. 1997.*

* cited by examiner

Primary Examiner—George B. Davis
(74) Attorney, Agent, or Firm—Staas & Halsey LLP

(57) ABSTRACT

A rules based decision management system using online analytical processing (OLAP) technology for dynamic assessment of strategy results. Generally, a rules based decision management system applies strategies which produce results. The results are aggregated over time, typically in accordance with values of a discrete dimension and ranges of a continuous dimension, to prepare for the application of OLAP technology. Date stamping can be used so that, when aggregating the results, different values and different ranges can be valid for different periods of time. OLAP technology is then applied to the aggregated results, to evaluate the applied strategies.

20 Claims, 16 Drawing Sheets

|  | BRONZE | GOLD | PLATINUM |
|---|---|---|---|
| TEST GROUP 1 | STRATEGY TEST CELL 1 | STRATEGY TEST CELL 2 | STRATEGY TEST CELL 3 |
| TEST GROUP 2 | STRATEGY TEST CELL 4 | STRATEGY TEST CELL 5 | STRATEGY TEST CELL 6 |
| TEST GROUP 3 | STRATEGY TEST CELL 7 | STRATEGY TEST CELL 8 | STRATEGY TEST CELL 9 |

FIG. 9

| OBSERVATION TIME | PERFORMANCE TIME | SEGMENT | TEST GROUP | CATEGORY | REPORT GROUP | DELQ | % CREDIT LINE USED | VALUE | PROFIT |
|---|---|---|---|---|---|---|---|---|---|
| 1/98 | 1/98 - 6/98 | 1 | 1 | BRONZE | A | # | # | # | # |
| 1/98 | 1/98 - 6/98 | 1 | 1 | BRONZE | B | # | # | # | # |
| 1/98 | 1/98 - 6/98 | 1 | 1 | BRONZE | C | # | # | # | # |
| 1/98 | 1/98 - 6/98 | 4 | 2 | GOLD | F | # | # | # | # |

Columns 3–6 are DIMENSIONS; columns 7–10 are METRICS. The full row set is ACCUMULATED PERFORMANCE DATA.

FIG. 12

| DATE | TEST | DESCRIPTION |
|---|---|---|
| 1/98 ··· 6/98 | T1 | TEST 1 |
| 1/98 ··· 6/98 | T2 | TEST 2 |
| 2/98 ··· 3/98 | T3 | TEST 3 |
| 3/98 ··· 9/98 | T4 | TEST 4 |
| 4/98 ··· 10/98 | T5 | TEST 5 |

FIG. 13

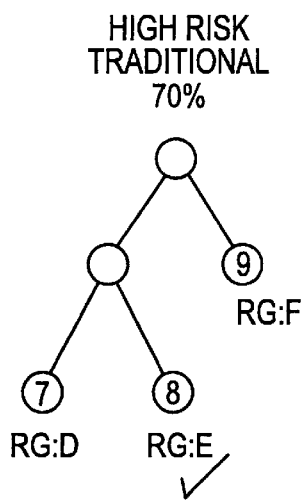
FIG. 14A
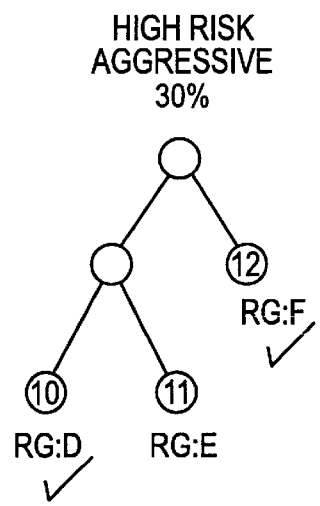
FIG. 14B
|  | HIGH RISK | MED RISK | LOW RISK |
|---|---|---|---|
| TRADITIONAL (70%) | 16 | 38 | 16 |
| AGGRESSIVE (30%) | 5 | 20 | 5 |
FIG. 14C
|  | HIGH RISK | MED RISK | LOW RISK |
|---|---|---|---|
| TRADITIONAL (70%) | 8 | 38 | 24 |
| AGGRESSIVE (30%) | 2 | 22 | 6 |
FIG. 14D

USE OF ONLINE ANALYTICAL PROCESSING (OLAP) IN A RULES BASED DECISION MANAGEMENT SYSTEM

CROSS REFERENCE TO RELATED APPLICATION

This application claims priority to provisional application 60/076,910, filed Mar. 5, 1998, and which is incorporated herein by reference.

This application is related to U.S. application titled SIMULTANEOUS CUSTOMER/ACCOUNT STRATEGY EXECUTION IN A DECISION MANAGEMENT SYSTEM, inventor Laurence Honarvar, U.S. application Ser. No. 09/216,985, filed concurrently herewith, and which is incorporated herein by reference.

This application is related to U.S. application titled DECISION MANAGEMENT SYSTEM FOR CREATING STRATEGIES TO CONTROL MOVEMENT OF CLIENTS ACROSS CATEGORIES, inventor Laurence Honarvar, U.S. application Ser. No. 09/216,985, filed concurrently herewith, and which is incorporated herein by reference.

BACKGROUND OF THE INVENTION

1. Field of the Invention

The present invention relates to a rules based decision management system for creating strategies to manage clients, such as customers, accounts, or applicants, of an organization. More specifically, the present invention relates to a rules based decision management system using online analytical processing (OLAP) technology for dynamic assessment and analysis of strategy results.

2. Description of the Related Art

A typical organization maintains a significant amount of information about its clients, where clients refer to the customers, accounts or applicants for services of the organization. This information can be effectively used, for example, to increase productivity and reduce costs, while achieving the goals of the organization. Such goals may be to improve profitability and maximize customer value.

For example, a company may sell various products to its customers, and may maintain a significant amount of information relating to its customers. This information can be used to improve many critical interactions with the customers, such as marketing communications, sales calls, customer service, collections, and general relationship management activities.

Consider the following examples.

Assume that a diversified financial services company is trying to leverage its customer base by cross-selling its various products. It currently uses limited internal customer information and credit bureau information to identify existing customers for cross-sell campaigns. For example, they might send "invitations to apply" for a home equity loan to those customers who own a mortgage with the company, and meet a minimum credit bureau score threshold. Imagine how much more powerful their cross-selling efforts would be if they could use information from all of the customers' accounts to offer pre-approved home equity loans to customers where the likelihood of a sale was high, the probability of default was low, and the financial value of that sale was high.

As another example, assume that a regional bell operating company is currently applying only age-based criteria (e.g., "days past due") to its accounts receivable portfolio to identify candidates for its collections department and to handle those customers. The content of the outbound collection notices and phone calls is driven solely by the age and amount of a customer's unpaid balance. Imagine if the company had a tool that helped it select and prioritize collection accounts based on the likelihood of a customer interaction making a bottom line difference. Instead of calling or writing all overdue accounts, they could focus resources on those where the customer interaction would make the greatest difference. In addition, they would save the expense and ill will generated by calling customers who would pay without a collections contact.

As a still further example, assume that a manager of a large telephone customer service center for a super-regional bank has been given only hard-line corporate policy to make decisions about fee and rate concessions. While her service reps attempt to stay to the company line, she is deluged with requests from good customers to talk to the manager. She uses her judgment based on the incomplete information available to her to decide which concessions are appropriate to prevent attrition of profitable customers. Just imagine if the service reps had guidelines that were specific to each customer, based upon customer data that indicates their value to the organization, likelihood of attrition, risk level, and other characteristics. The manger could stand by these guidelines with confidence. There would be no concessions made to unprofitable customers, fewer manager overrides, shorter calls, and reduced attrition of the customers they want to keep.

As diverse as the above examples appear on the surface, they share several common characteristics. Each involves a large customer base and a high volume of customer interactions. Each organization has a substantial amount of accumulated data regarding the characteristics, purchasing/ behavior patterns, and profitability of customers (though the data may not yet be well organized or analyzed). Each organization has an opportunity to improve performance substantially by treating different customers and customer groups differently, due to diversity in customer relationships and their potential. In each case, there are desired outcomes that could result from alternative customer interactions (e.g., customer purchases a product, pays an outstanding bill, increases deposit balances), and those outcomes can readily be identified, quantified, and tracked.

Therefore, each of the above examples depicts a business situation that currently is not fully benefiting from decision support and therefore is yielding less than optimal results.

There are software based products in the marketplace which can organize information to make more effective decisions. For example, the American Management Systems (AMS) Strata™ decision support system release 2.0 (hereinafter Strata™ release 2.0) is a software based system which applies predictive modeling techniques to customer data, to thereby generate dramatic improvements in the effectiveness and profitability of customer interactions.

FIG. 1 is a diagram illustrating the general concept of a software-based decision management system, such as Strata™ release 2.0, which applies predictive modeling techniques to customer data.

Referring now to FIG. 1, a software based system 10 receives information from operational and/or customer information systems 20, such as, for example, billing systems, account management systems, credit bureau systems and data warehouses. Software based system 10 prioritizes and tailors customer interactions based on predictive information, specific business rules, and continually evolving decision strategies. Software based system 10 then determines an appropriate action which is to be taken by an action-taking system 30. An appropriate action to be taken could include, for example, a call to a customer, a specific collections procedure or a specific marketing action.

A decision management system as in FIG. 1 can provide superior results, such as increased revenue generation, improved cost-effectiveness and enhanced customer relationships.

FIG. 2 is a more detailed diagram illustrating the operation of the decision management system Strata™ release 2.0.

Referring now to FIG. 2, in step 40, an inbound event is a trigger that is received from one or more external systems to identify that a particular client event has occurred. Such events may be automatically generated due to client behavior or systematically produced at specified time intervals (i.e., monthly). Examples of inbound events include a customer declaring bankruptcy, a credit underwriting decision request, a credit account delinquency, an income statement cycle date, or a routine evaluation date (a periodic, scheduled evaluation).

From step 40, the system moves to step 50, where a client is assigned to a segment. A segment is a grouping of clients based on a characteristic by which the clients will be separated for applying different rules. Generally, a segment is a high level segregation of clients for the purpose of associating largely independent high level strategy. Segments are completely separate groups of clients, for which a unique set of evaluation processes have been defined. For example, a telecommunications company might have a segment for residential customers and another for business customers.

From step 50, the system moves to step 60, where clients are randomly grouped into different test groups for the purpose of applying competing policy rules, strategy, or experiments. Generally, test groups allow for strategy comparison. Just as in research environments, the behavior or outcomes of an experimental "test" population is compared to that of a "control" group that is not exposed to the experimental treatment. A strategist can specify what percentage of the clients should be randomly assigned to each test group. If the strategy associated with a test group is successful, that strategy may later be deployed to a larger percentage of the clients.

From step 60, the system moves to step 70, where inbound events are matched to processes. More specifically, it is defined which processes are invoked in response to each inbound event. For example, different processes are created for a credit card campaign versus a late payment. The order of process execution is also specified.

Processes can be seen as individual decision logic modules which are invoked in response to inbound events. This modular approach to defining decision strategies facilitates logic re-use and the ability to deploy robust strategies required to coordinate customer, account and marketing decisions.

From step 70, the system moves to step 80, where the specific processes for all inbound events coming into the system are executed.

From step 80, the system moves to step 90, where the results, or action to be taken, are output.

Therefore, in FIG. 2, based on the type of inbound event(s) received, an appropriate sequence of decision logic modules, or processes, is invoked, where the sequence of decision logic modules is predefined by a strategy analyst.

FIG. 3 is a diagram illustrating an example of a segment being divided into different test groups as in step 60 of FIG. 2. Referring now to FIG. 3, 10% of the segment is randomly assigned to test group 1, 10% of the segment is randomly assigned to test group 2, and 80% of the segment is randomly assigned to test group 3.

FIGS. 4(A) and 4(B) are diagrams illustrating the matching of inbound events to processes in step 70 of FIG. 2. Referring now to FIG. 4(A), for example, when an inbound event 91 is a credit card campaign, the following processes are applied, in order: credit card propensity to buy score 92, risk score 93 and offer selection 94. A result 95 of the applied processes is a determination of whether to send a credit card offer.

Similarly, referring now to FIG. 4(B), for example, when an inbound event 96 is a late payment, the following processes are applied, in order: risk score 97, underwriting treatment 98 and overdraft decision treatment 99. A result 100 of the applied processes is a determination whether to send new underwriting and overdraft codes.

Processes are decision logic modules formed by one or more "mechanisms". Mechanisms can be, for example, decision trees or score models. There are preferably several different mechanisms which are available in the creation of any process. One or more mechanisms are typically grouped into processes when they have comparable objectives (i.e., score cards to predict risk, decision trees to evaluate a credit line, etc.). Generally, the objective is typically reflected in the name of the process itself as defined by the user.

In this conventional decision management system, only a single set of variables is defined. This single set of variables is written over and used for each process. Subsequent processes write over the data stored in the variables from the previous process. For example, referring to FIG. 4, once a risk score is computed by risk score 93, this risk score is stored into a variable which may have stored a score computed by credit card propensity to buy score 92. Thus, the results of the processes are written over each other into the same set of variables. In this manner, the decision management system has a forced dependency between processes.

FIG. 5 is a diagram illustrating the grouping of mechanisms to processes. Referring now to FIG. 5, when an inbound event 91 triggers a specific process, the specific mechanism to be applied to a client will be determined by the test group into which the client was assigned. This allows for strategy experimentation by defining a common sequence of processes for a given inbound event, but differentiating the actual mechanism that will be invoked for each process depending on the respective test group into which the client was randomly assigned.

If a process only contains one mechanism, no experimentation will take place in that process since every client, regardless of its test group, will be required to use the mechanism. For example, in FIG. 5, no experimentation takes place in the credit card propensity to buy score 92, since this process contains only one mechanism. By contrast, in FIG. 5, experimentation takes place in offer selection 94, since this process includes more than one mechanism. This approach provides the strategy analyst with the flexibility to selectively experiment on each component of the overall strategy, as appropriate.

Processes can include many different types of mechanisms, including decision trees, score models and matrices. Decision trees are the most common.

FIG. 6 is a diagram illustrating a decision tree. A decision tree employs pre-defined logic to route clients to the appropriate endpoint. Generally, a decision tree contains layers of rule-driven decision points, or nodes (starting with a root node at the top of the tree), from which clients are allocated to lower and lower branches of a tree until they ultimately reach an endpoint of the tree (a terminal node). Because decision trees can vary in structure (e.g., number of branches, nodes per branch) and because decision trees can call other decision trees, decision trees provide extensive flexibility for designing client strategies.

The above-described decision management system can allow hybrid strategies to be developed, based on the success of different experiments.

For example, FIG. 7 is a diagram illustrating the effectiveness of creating a hybrid strategy in a decision management system, such as Strata™ release 2.0.

Referring now to FIG. 7, a "test" strategy is applied to test group A, where customers in test group A are divided into two groups, TGA1 and TGA2. Group TGA1 includes all customers less than 40 years old. Group TGA2 includes all customers greater than or equal to 40 years old. A letter is sent to customers whether they are in group TGA1 or TGA2. The end result is that a letter is 60% effective for the customers in TGA1, and 70% effective for customers in TGA2. Assuming that 50% of the population is greater than or equal to 40 years old, and 50% of the population is less than 40 years old, the overall success rate of the test strategy is 65%.

Similarly, a "control" strategy is applied to test group B, where customers in test group B are divided into two groups, TGB1 and TGB2. Group TGB1 includes all customers less than 40 years old. Group TGB2 includes all customers greater than or equal to 40 years old. A call is made to customers whether they are in group TGB1 or TGB2. The end result is that a call is 50% effective for the customers in TGB1, and 90% effective for customers in TGB2. Assuming that 50% of the population is greater than or equal to 40 years old, and 50% of the population is less than 40 years old, the overall success rate of the control strategy is 70%.

An overall comparison of results of test group A (the "test" strategy) versus test group B (the "control" group) indicates that the control strategy is superior, as measured by overall success rate. However, when strategy effectiveness is reported at the comparable path level through the test and control strategies, it is possible to build a new hybrid strategy that will outperform either the test strategy or the control strategy by combining the best performing actions of each strategy. For example, the hybrid strategy would send a letter to all customers less than 40 years old, but call all customers greater than or equal to 40 years old. Such a hybrid strategy should produce an expected overall success rate of 75%, which is higher than either of the test or control strategies.

Such an approach for determining a hybrid strategy could be used, for example, to improve the strategy in offer selection 94 in FIG. 5, where different strategies are applied to different test groups. The formation of a hybrid strategy can significantly increase the effectiveness and profitability of an organization.

However, the above decision management system does not effectively monitor performance of the strategies in certain situations. As a result, strategies cannot be effectively refined. For example, the above decision management system does not monitor performance and develop strategies in a way which effectively moves customers from one category to another. More specifically, the decision management system will not allow a credit card company to monitor performance and effectively develop strategies to move customers from the Silver category to the Gold category. In addition, the monitoring facilities of the decision management system are predefined and cannot allow for interactive analysis of the results.

SUMMARY OF THE INVENTION

Therefore, it is an object of the present invention to provide a decision management system which effectively monitors performance of applied strategies.

More specifically, it is an object of the present invention to provide a decision management system using online analytical processing (OLAP) technology for dynamic assessment of strategy results.

Additional objects and advantages of the invention will be set forth in part in the description which follows, and, in part, will be obvious from the description, or may be learned by practice of the invention.

Objects of the present invention are achieved by providing a method and apparatus which apply strategies in a rules based decision management system. The applied strategies produce results. Then, online analytical processing (OLAP) technology is applied to evaluate the results of the applied strategies.

Further, objects of the present invention are achieved by providing a computer-implemented process which (a) applies strategies in a rules based decision management system, the applied strategies producing results; (b) aggregates the results over time; and (c) applies online analytical processing (OLAP) technology to evaluate the aggregated results of the applied strategies.

In addition, objects of the present invention are achieved by providing a computer-implemented process which (a) applies strategies which produce results; (b) time stamps initial values of a discrete dimension; (c) changes a value of the discrete dimension, and time stamps the changed value; and (d) aggregates the results in accordance with the time stamped initial values and the time stamped changed value, thereby allowing for interactive, multi-dimensional analysis via OLAP technology.

Moreover, objects of the present invention are achieved by providing a computer-implemented process which (a) applies strategies which produce results; (b) time stamps initial ranges of a continuous dimension; (c) changes a range of the continuous dimension, and time stamps the changed range; and (d) aggregates the results in accordance with the time stamped initial ranges and the time stamped changed range, thereby allowing for interactive, multi-dimensional analysis via OLAP technology.

BRIEF DESCRIPTION OF THE DRAWINGS

Reference will now be made in detail to the present preferred embodiments of the present invention, examples of which are illustrated in the accompanying drawings, wherein like reference numerals refer to like elements throughout.

FIG. 9 is a diagram illustrating a matrix created in a decision management system, for analyzing data and applying strategies, according to an embodiment of the present invention.

FIG. 12 is a diagram illustrating an example of a row of data having a dimensions part and metrics part, according to an embodiment of the present invention.

FIG. 13 is a diagram illustrating a look-up table for a dimension in the row illustrated in FIG. 12, according to an embodiment of the present invention.

FIGS. 14(A), 14(B), 14(C) and 14(D) are diagrams illustrating the operation of a decision management system in optimizing strategy or policy based on results, according to an embodiment of the present invention.

DESCRIPTION OF THE PREFERRED EMBODIMENTS

Figure 8:
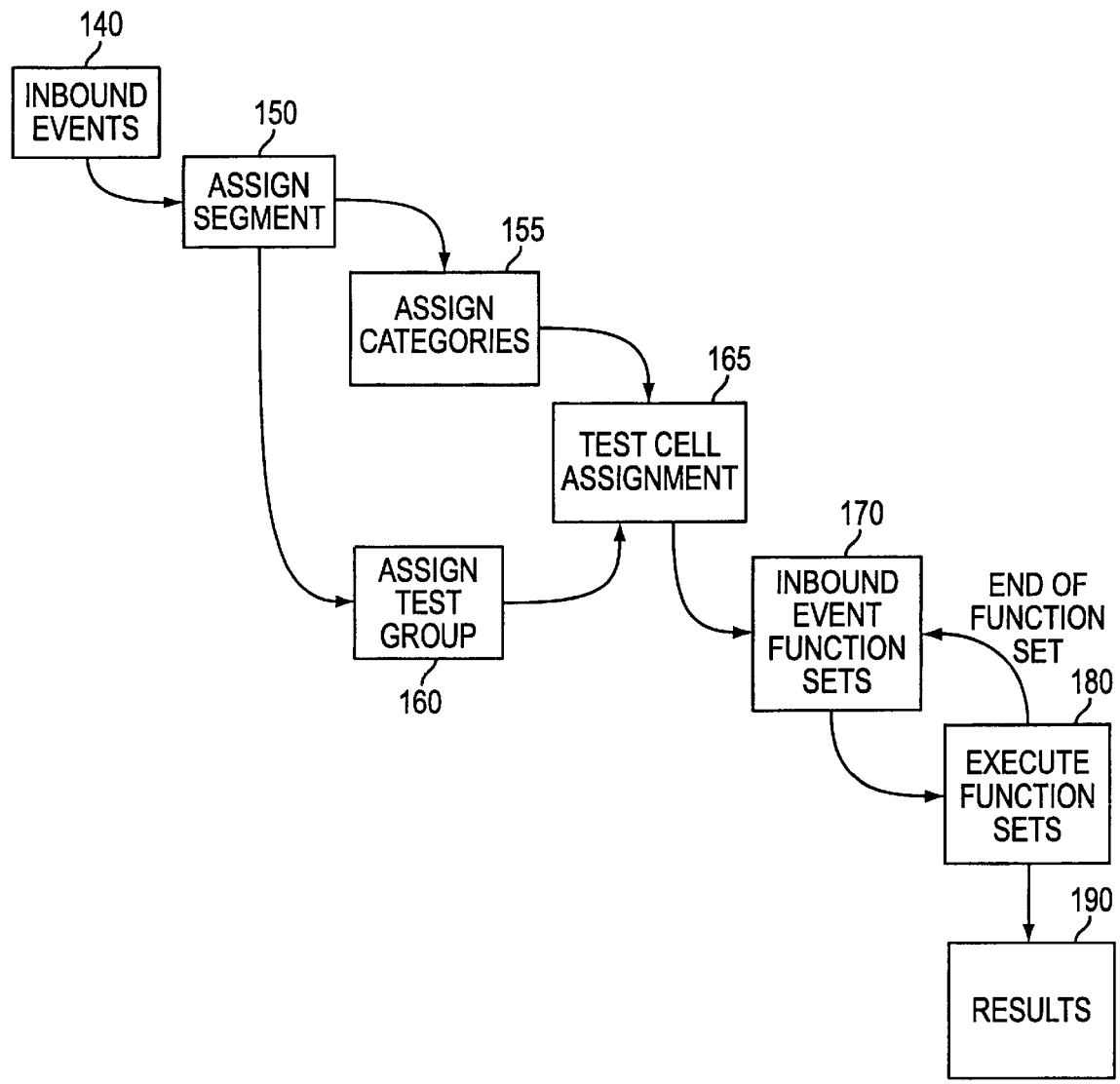
FIG. 8 is a diagram illustrating the functional flow of a decision management system, according to an embodiment of the present invention.

FIG. 8 is a diagram illustrating the functional flow of a decision management system, according to an embodiment of the present invention. Referring now to FIG. 8, in step 140, an inbound event is a trigger that is received from one or more external systems to identify that a particular client event has occurred. Here, a client refers to people or entities which interact with, or do business with, an organization. For example, clients include customers, accounts or applicants for services of the organization.

From step 140, the system moves to step 150, where clients are assigned to different segments. A segment is a grouping of clients based on a characteristic by which the clients will be separated for applying different rules. Generally, a segment is a high-level segregation of clients for the purpose of associating largely independent high-level strategy. Thus, segments are separate groups of clients, for which a unique set of evaluation procedures have been defined. For example, a telecommunications company might have a segment for residential customers and another for business customers. Each segment can have, for example, a separate manager who is the only one with security rights to setup or modify the evaluation procedure for that segment.

From step 150, the system moves to step 155, where each segment is further divided into categories. A category is a grouping of clients as defined by the organization such that it aligns client interaction/value management objectives. In other words, categories represent groups of clients based on how the organization views the clients. For example, a bank may divide clients (such as credit card holders) into the categories of Bronze, Gold, and Platinum, based on how the bank views the credit worthiness of the clients.

From step 150, the system also moves to step 160, where clients are grouped in a random manner into different test groups for the purpose of applying competing policy rules, strategy, or experiments. Thus, steps 155 and 160 can be seen as being performed in parallel and/or having no interdependency.

After steps 155 and 160, each segment has now been divided into test groups and categories. Categories and test groups can be considered to be at the same level in the strategy hierarchy.

From steps 155 and 160, the system moves to step 165, where a matrix is created for each segment, with the categories and test groups on different axes, to create a strategy test cell at the intersection of each category and test group. Here, it is not necessary that a matrix be "physically" created. Instead, the data must simply be organized or arranged in some manner that allows clients to be conceptually represented in a data structure equivalent to a matrix, so that clients can be associated with, or assigned to, strategy test cells.

Figure 1:
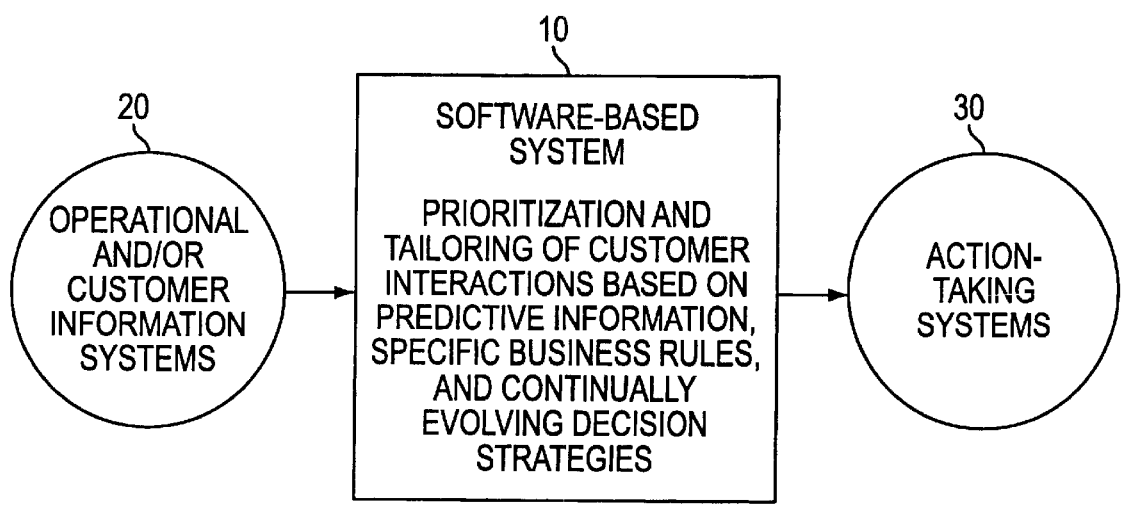
FIG. 1 (prior art) is a diagram illustrating the general concept of a software-based decision management system which applies predictive modeling techniques to customer data.
Figure 2:
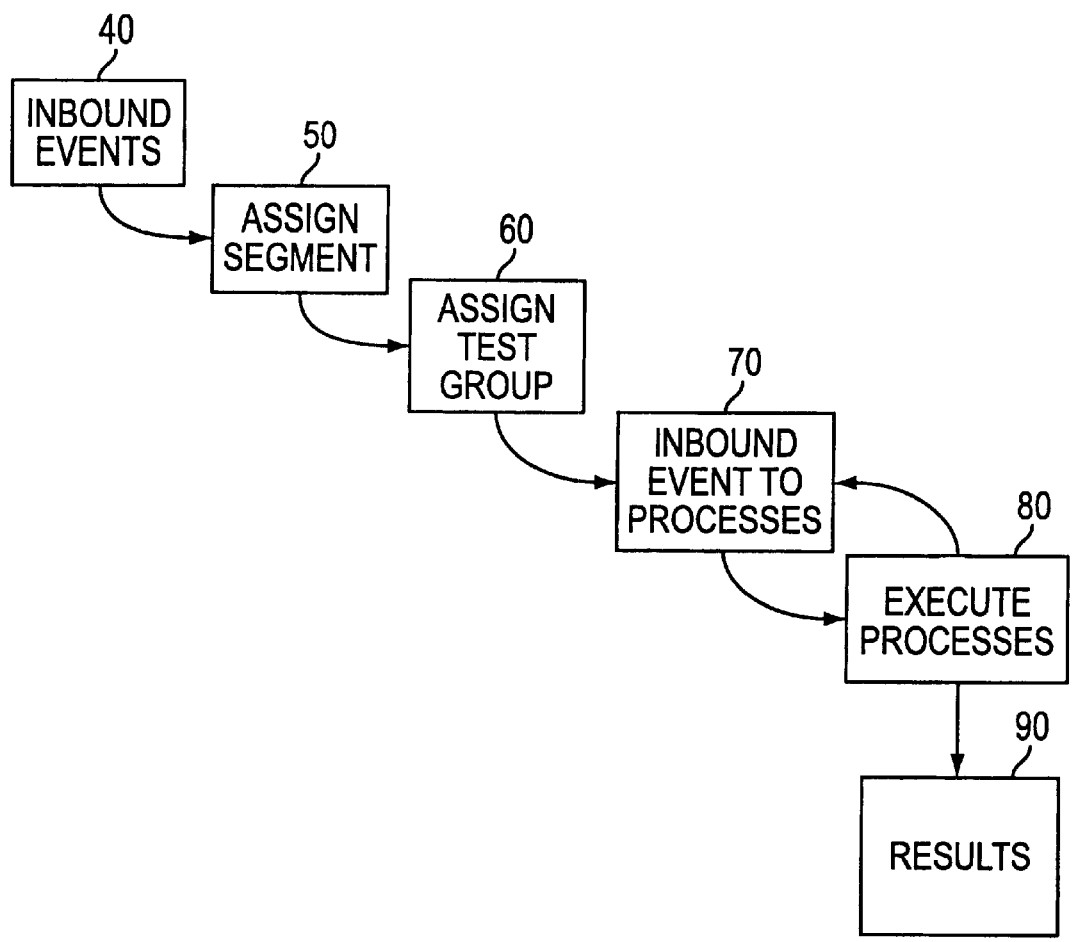
FIG. 2 (prior art) is a more detailed diagram illustrating the operation of a decision management system.
Figure 3:
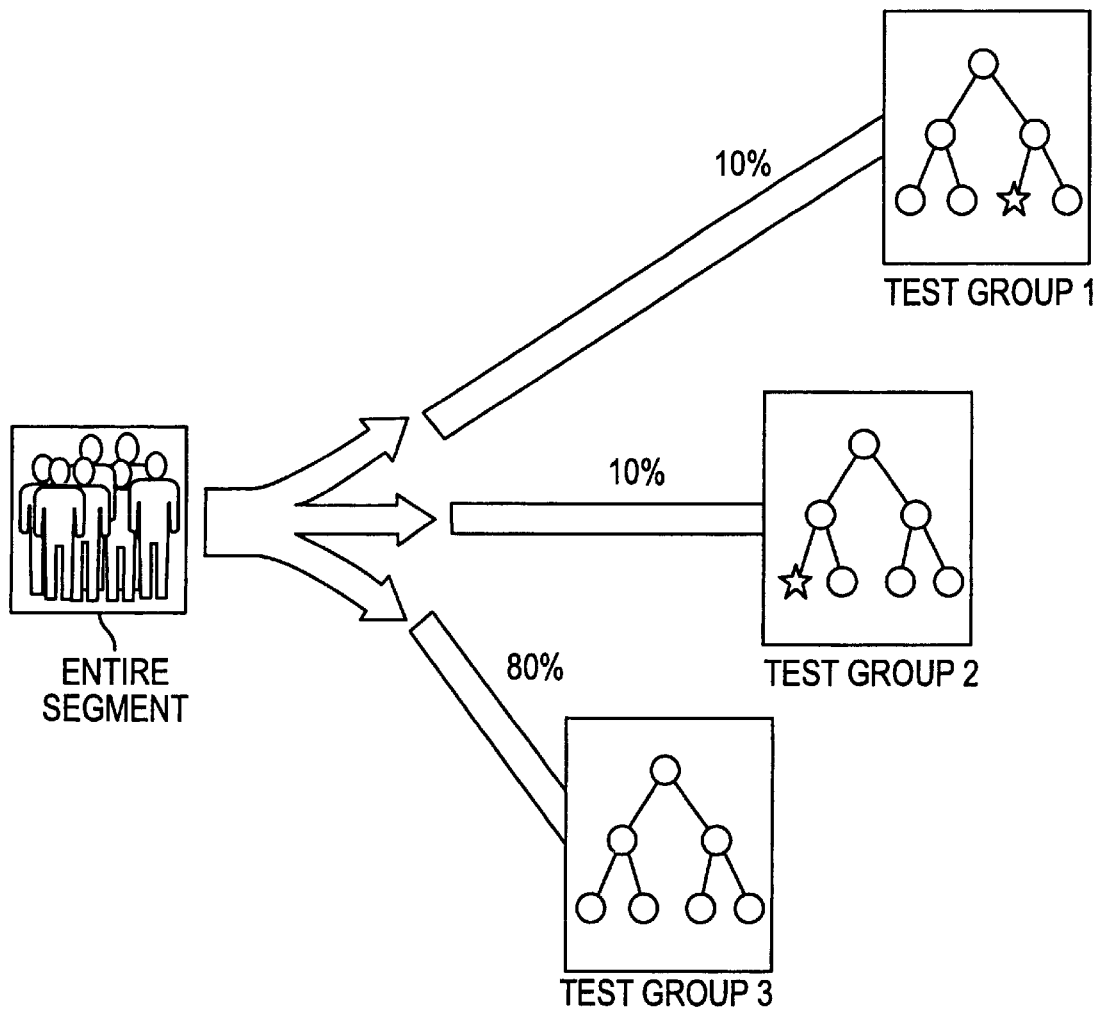
FIG. 3 (prior art) is a diagram illustrating an example of a segment being divided into different test groups in a decision management system.
Figures 4A, 4B:
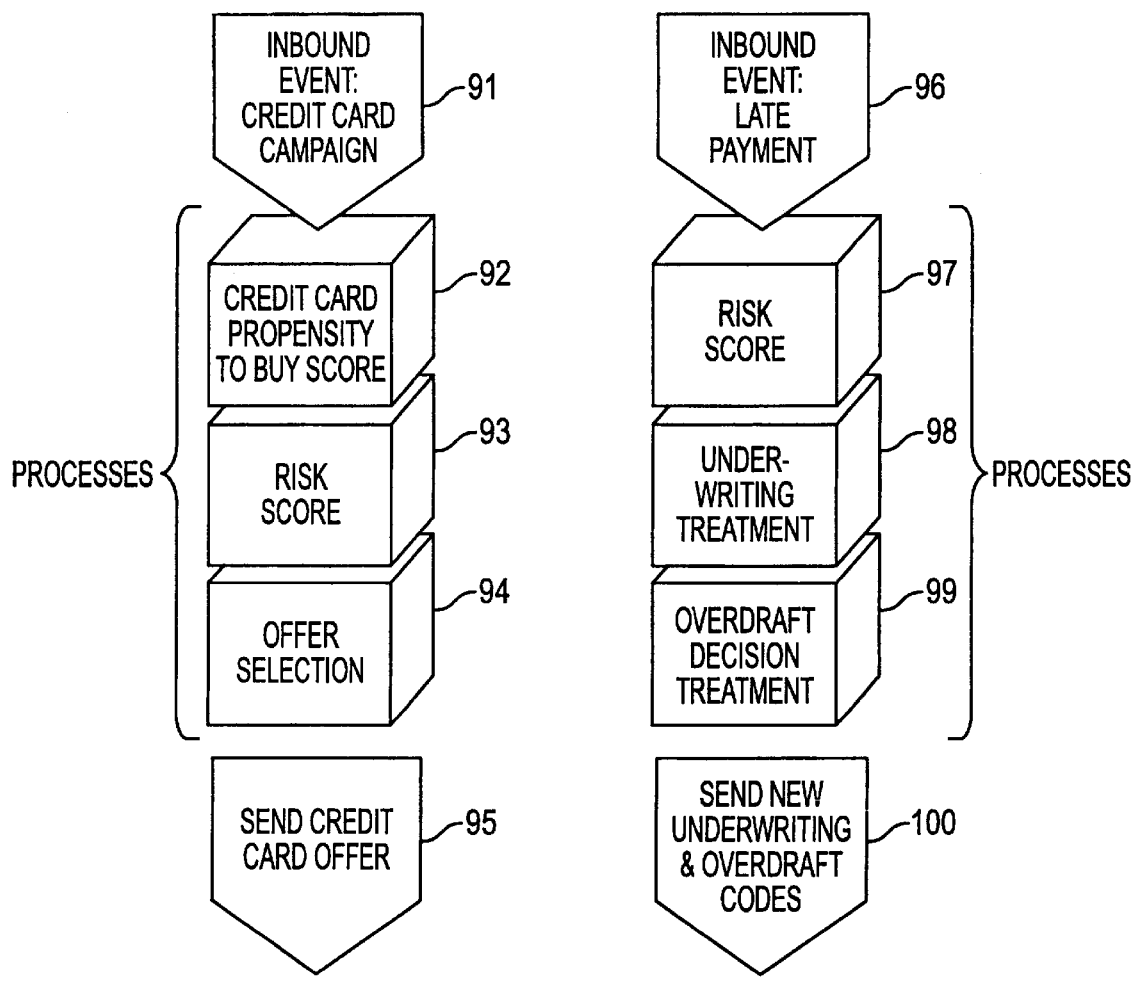
FIGS. 4(A) and 4(B) (prior art) are diagrams illustrating the matching of inbound events to processes in a decision management system.

From step 165 the system moves to step 170, where inbound events are matched to function sets. Here, a function set has a similar meaning as a "process" described, for example, in FIGS. 4(A) and 4(B), but the present invention uses a different terminology.

From step 170, the system moves to step 180, where the specific function sets for one or more specific inbound events are executed.

From step 180, the system moves to step 190, where the results, or action items, are output.

FIG. 9 is a diagram illustrating the creation of a matrix of the categories and test groups for a respective segment, as in step 165 of FIG. 8, according to an embodiment of the present invention. Referring now to FIG. 9, categories of, for example, Bronze, Gold and Platinum are on one axis of the matrix, and test groups 1, 2 and 3 are on the other axis of the matrix. The intersection of a respective category with a respective test group represents a strategy test cell of the matrix.

Then, possibly for each function set, different strategies are designed for different strategy test cells of the matrix.

Figure 5:
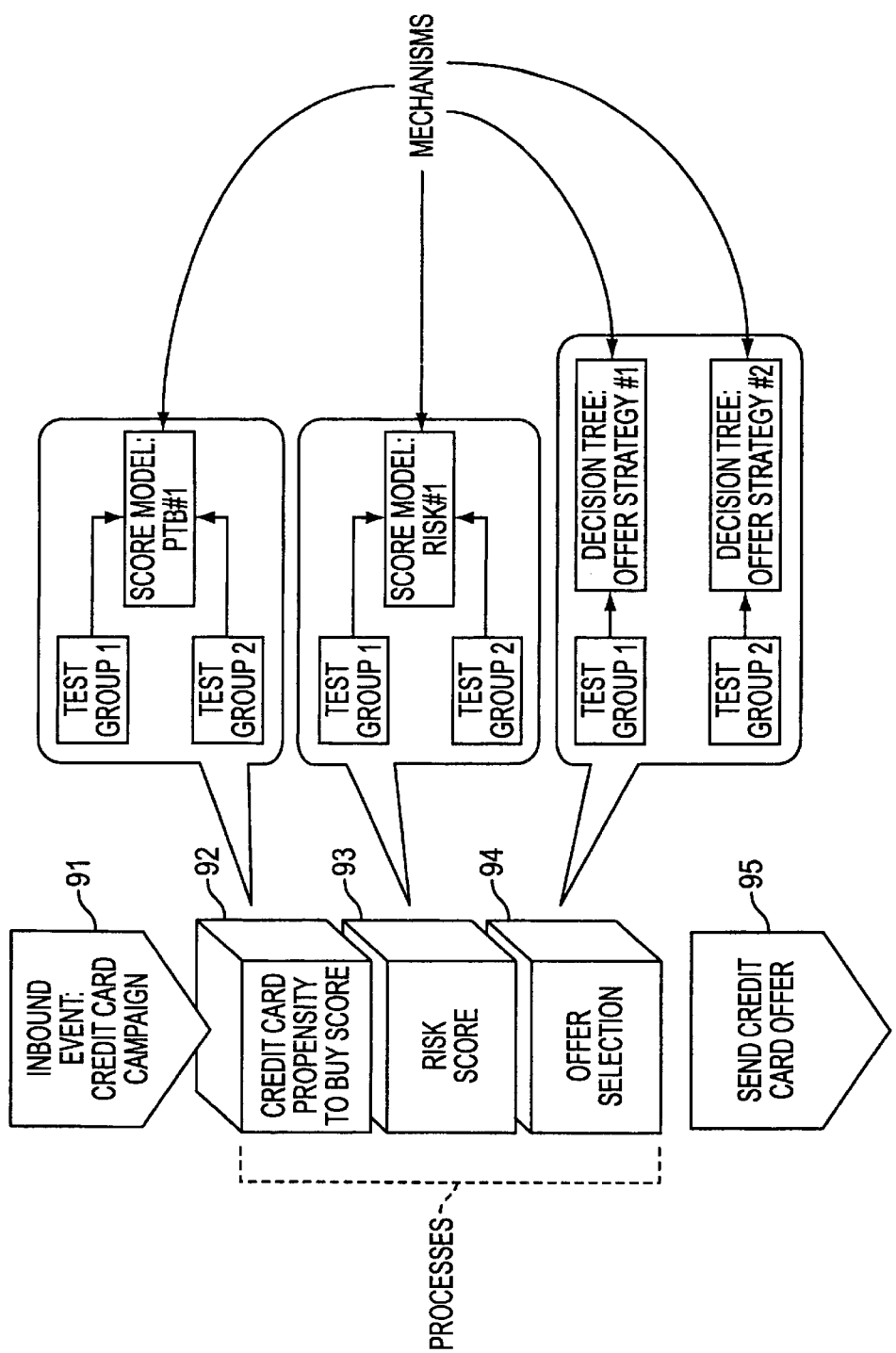
FIG. 5 (prior art) is a diagram illustrating the grouping of mechanisms to processes in a decision management system.
Figure 6:
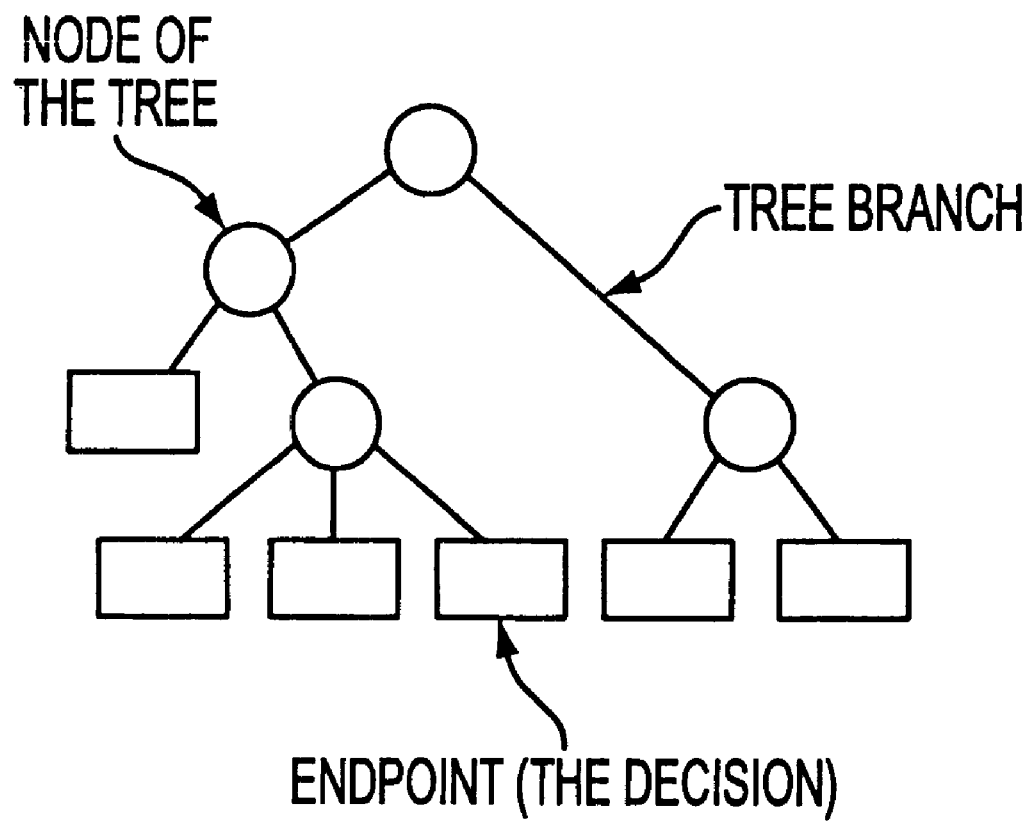
FIG. 6 (prior art) is a diagram illustrating a decision tree.
Figure 7:
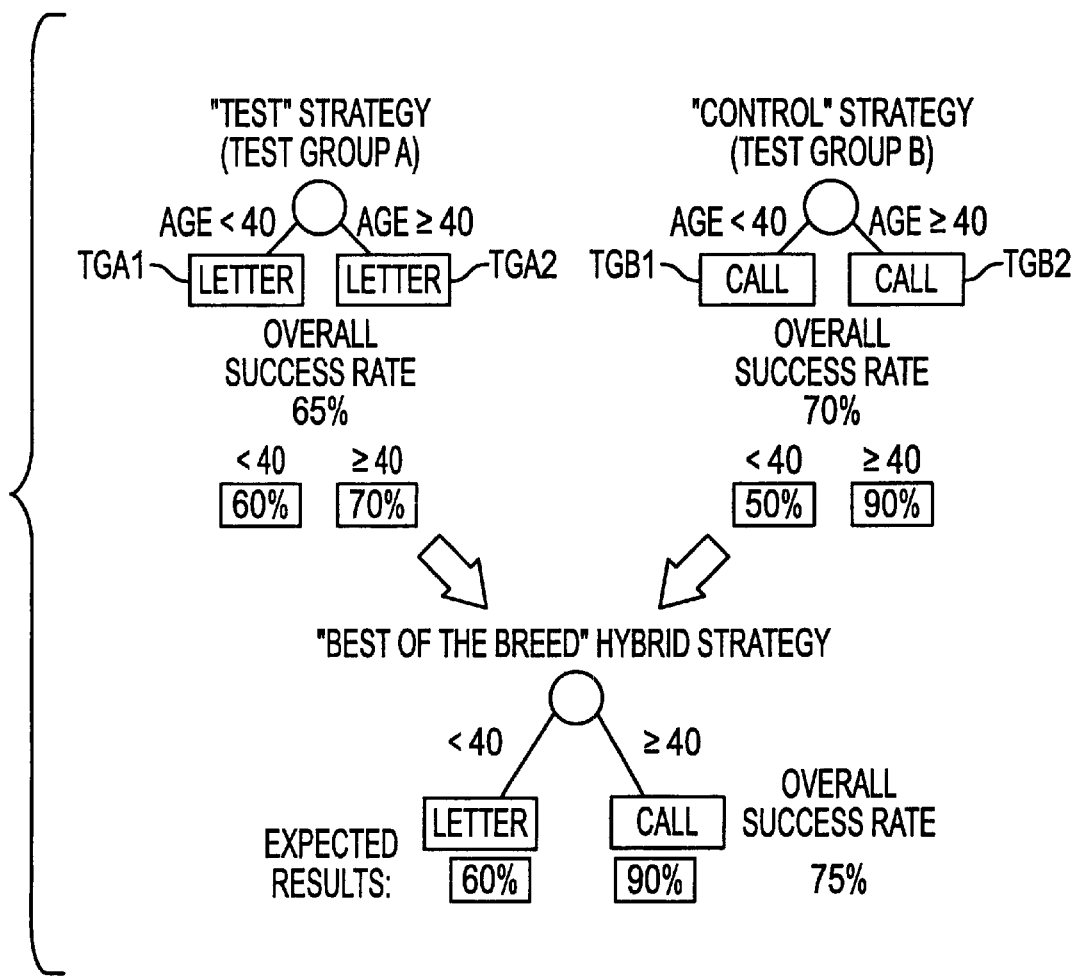
FIG. 7 (prior art) is a diagram illustrating a hybrid strategy in a decision management system.

A function set is formed by one or more functions, where a function can be, for example, a decision tree, a score model, a matrix, a user exit or a list processor. Here, a function has a similar meaning as a "mechanism" described, for example, in FIG. 5, but the present invention uses a different terminology and provides the ability to store each result independently. Moreover, in the conventional system of FIG. 5, user exits and list processors were not available as mechanisms. Thus, generally, the correlation of function sets to functions is similar to that for processes to mechanisms in FIG. 5, but the terminology is different.

Figure 10:
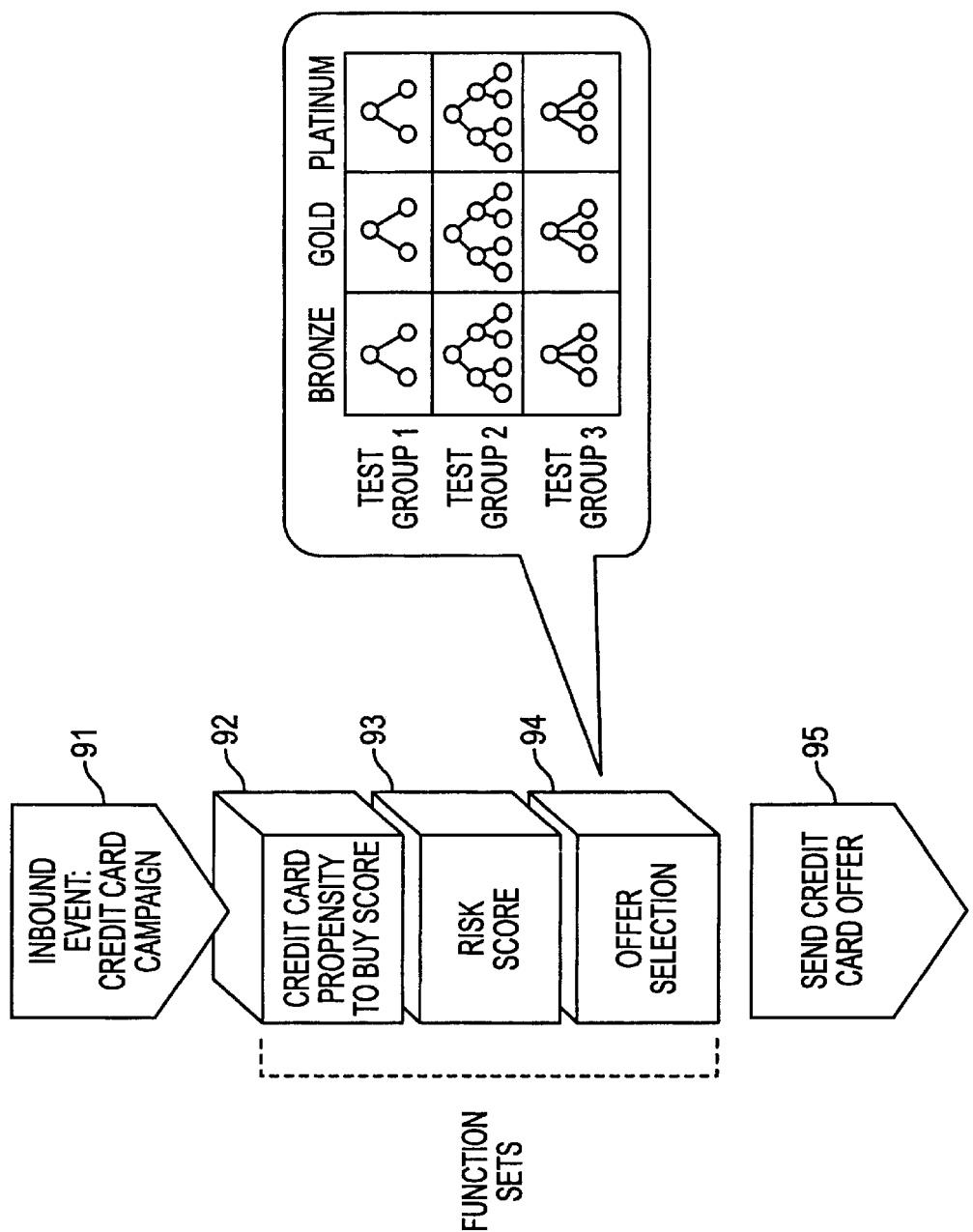
FIG. 10 is a diagram illustrating the correspondence of functions of a respective function set to strategy test cells of a matrix, according to an embodiment of the present invention.

FIG. 10 is a diagram illustrating an example of the correspondence of functions of a respective function set to the strategy test cells of the matrix, according to an embodiment of the present invention. Referring now to FIG. 10, various function sets, including credit card propensity to buy score 92, risk score 93 and offer selection 94, are executed in a user-defined order upon the occurrence of inbound event 91. Offer selection 94 includes a respective function, which is possibly a decision tree, for each strategy test cell.

Preferably, the structure of the decision tree is the same for a respective test group across each category. For example, in FIG. 10, the tree structure in the strategy test cells for test group 1 are the same for each of the Bronze, Gold and Platinumn categories. Of course, tile actual decisions made at each node and the branching criteria can be different. Similarly, the tree structure in the strategy test cells for test group 2 are the same for each of the Bronaze, Gold and Platinum categories. This allows comparison across categories. The same principle holds across test groups for a given category.

Further, it is not necessary for a function set to have a different function for each strategy test cell. Some, or even all, of the strategy test cells for a respective function set can have the same function, depending on the level of testing which is desired to be performed. The specific design of the functions of a respective function set as they correlate to strategy test cells is a matter of design choice, thereby allowing greater flexibility in configuration of the system.

As a strategy is designed, the strategy test cells will be examined against each other. Preferably, there is a common set of metrics for the entire matrix, where the metrics are the appropriate measurements against which to measure the performance of the strategy defined for a segment. Then, it can be determined how well a test group is shifting customers to other categories. For example, it can be determined how quickly test group 1 is moving Bronze customers into the Platinum category in the matrix of FIG. 9.

Although it is preferable to create a data structure which is in "matrix" form for analyzing the movement of clients, the present invention is not intended to be limited to the use of a "matrix." Instead, any data structure which is equivalent to a matrix in providing the required functionality for defining strategy and analyzing the movement of clients will be appropriate. Therefore, generally, many different types of data structures providing an intersection between categories and test groups can be used.

As described above, once clients are placed into categories, the strategy test cells in the matrix are used to design experiments. For example, for the Bronze category, a series of experiments can be designed for each strategy test cell in that category.

In addition, as will be described in more detail below, the decision management system can measure performance so that the overall strategy can be appropriately adjusted to optimize results.

FIGS. 8–10 represent the logical flow of how strategy test cells are created, or assigned. However, the systematic or technical flow may be different. For example, the loop between steps 180 and 170 in FIG. 8 typically executes several function sets. Preferably, all non-test group specific function sets are executed first. These typically include the assessment/execution of predictive algorithms and models. Subsequently, a categorization function set can be executed, to categorize the clients. The categorization function set is generally not test group specific, and often uses the information derived from the function sets that have already been executed. Thereafter, a test cell assignment function set may be executed, to assign clients to specific test cells, or the system user may simply do this implicitly through the definition of rules.

Figure 11:
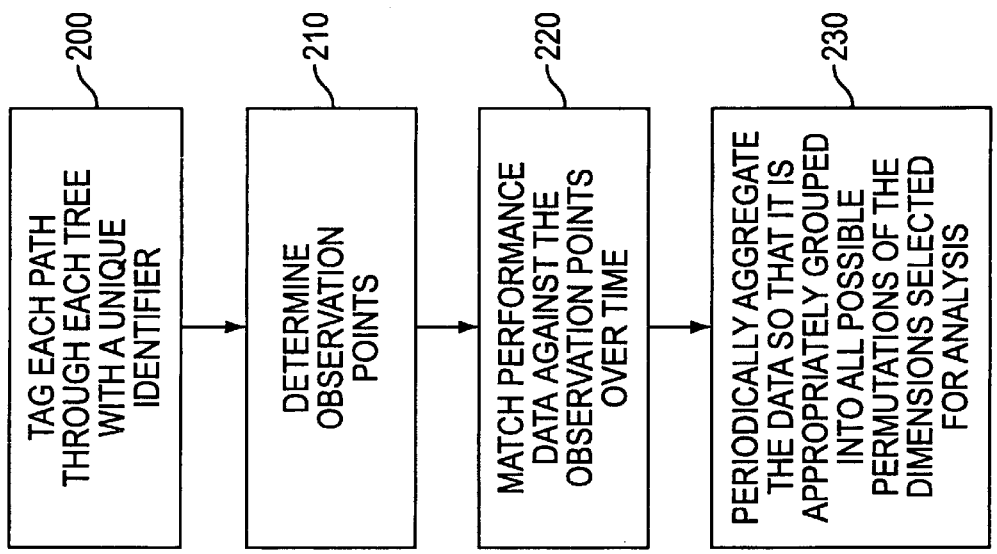
FIG. 11 is a diagram illustrating the overall operation of a decision management system for measuring performance, according to an embodiment of the present invention.

FIG. 11 is a diagram illustrating the overall operation of a decision management system for measuring performance, according to an embodiment of the present invention. More specifically, FIG. 11 illustrates a data aggregation operation for effectively managing and organizing data, and is performed to support the use of online line analytical processing (OLAP) technology.

Referring now to FIG. 11, in step 200, each path through each decision tree is tagged with a unique identifier referred to as a report group. Although it is preferable to tag each path through each tree so that complex strategy can be created and refined, it is not necessary for each path to be tagged. Instead, the selection of which paths to tag is a matter of design choice, based on the strategy parameters of the decision management system.

A report group is a tag which identifies a unique path through a policy, strategy or set of rules, and is preferably, although not necessarily, applied to terminal nodes of decision trees. A report group is preferably independent of the test group, so that it can be associated with the same branch of comparable trees in two or more test groups. Report groups are a valuable strategy evolution tool, and enable comparative evaluation of strategy effectiveness for categories within a segment. Categories allow for the analysis of clients who, once being individually evaluated against user-defined criteria, are determined to have similar qualities in consideration of organizational objectives. For example, a category may be defined as all customers who have average current value, high potential value, and a low probability of attrition. Report groups can be placed throughout a decision strategy in order to assure that performance results are accumulated for each respective part of the strategy. The concept of tagging a path to measure performance, as with a report group, is known.

All clients in a given report group should be relatively homogenous, the difference being the test group to which the clients were randomly assigned and thus the action/decision applied to the clients being based on their test group. Since report groups are independent of test groups, they allow for comparison of the same or alternate categories across experiments (i.e., comparison within the category Platinum of a report group for the test 1 and control test groups). Decision effectiveness reports can then track specified performance metrics (i.e., response rate for marketing, approval rate for underwriting, etc.) by test group for each report group.

A decision management system according to the embodiments of the present invention collectively uses test groups, report groups, categories and user-defined multi-dimensional decision effectiveness reports to quickly determine the most effective strategy for each segment within a client portfolio.

Referring again to FIG. 11, from step 200 the system moves to step 210, where observation points are determined. More specifically, each time a decision is made about a client, that decision is posted. More importantly, the report group that the client passed through is posted. In addition, what segment, category, test group, etc. is posted. This is referred to as an observation point. An observation point is not intended to be limited to posting any specific criteria, so that a strategy analyst has flexibility in determining what data should be posted. Similarly, an observation point is not intended to be limited to only being triggered by decisions. For example, a score model or matrix invocation could trigger an observation.

From step 210, the system moves to step 220, where performance over time for observation points is accumulated, and matched against the observation points. Generally, an observation point is a snap-shot of a point in time, and has dimensions across which analysis of the data can be performed. A specific client can have multiple observation points. Therefore, in step 210 in FIG. 11, observation points for a client are noted. Then, in step 220, for each client, performance data is matched against observation points. For example, once a month, performance data for a client may be obtained. This performance data is then matched, or correlated, to the appropriate observation points for each account and/or customer.

For example, on Jan. 1, 1998, assume that a decision is made to increase a client's credit limit by $500. This information is stored as an observation point. Data stored as part of the observation point's dimensions may be, for example, client ID, what segment the client was in, what category the client was in, what test group the client was in and what report group the client was in when that decision was made.

On Jan. 31, 1998, Feb. 31, 1998, Mar. 31, 1998, etc., some additional performance data may be obtained. For example, how much of the credit line increase was used? Did the client go delinquent on the account? What was the current value of the customer? What was their profitability? For example, over the course of a year, twelve (12) sets of performance data may be obtained for this client, each including all of these performance metrics.

Over the course of the year, other decisions may be made. For example, a mortgage offer may have been made to the client. This mortgage offer would represent a new observation point. From this time on, performance data would be accumulated for that observation point. In January 1999, observation points made in January 1998, can possibly be rolled off, depending on the user's desired parameters dictating how long performance is to be retained. Therefore, for example, the performance of the January 1998, credit line increase decision has been tracked for twelve months, but it will not be tracked anymore. However, performance data will still be accumulated for the observation point where the mortgage offer was made. How long to accumulate and maintain performance data for a specific observation point is a matter of design choice. Common performance data may be captured once for multiple observations.

From step 220, the system moves to step 230, where the collected performance data is periodically aggregated and grouped, preferably, into all possible permutations of the dimensions noted when the observation point was taken and selected for analysis. Generally, in step 230, it is not desirable to report on a specific client, but how well a specific test group or strategy performs. For example, the data is preferably aggregated to determine the performance of segment 1, test group 4, bronze customers, report group B. An aggregate performance data measure can then be determined for all clients meeting this criteria. In this manner, it can be evaluated how well a certain test group or category performed, instead of how well a specific client performed. Thus, strategy performance can be evaluated, instead of individual client performance. As a result of the aggregation of data, a row of data having two parts, dimensions and metrics, can be created. Dimensions are the ways the organization wants to view the performance results. For example, segment and category would be dimensions. Aggregating the data in a row allows us to view the intersection of the different points in the matrix created in step 165 of FIG. 8. For example, by aggregating the data, we can view all the metrics, or results, associated with Bronze, test group 2. The users can interactively select which dimensions to apply in filtering the results.

Therefore, the dimensions of the rows should preferably provide all the different ways in which it is intended to analyze the performance data. The dimensions would likely include combinations that allow data relating to the category assignment matrix to be viewed, and combinations that allow data relating to specific strategy paths to be viewed.

For example, a row might typically include the dimensions of segment, test group, category and report group. The metrics for that row should include data relating to those dimensions, such as, for example, delinquency, % credit line used, value, profit. Therefore, by storing dimensions as a "key" to the data, a "solution set" of metrics is obtained which matches that key.

Each row can be thought of as being a unique intersection of values for all dimensional columns. Preferably, the metrics associated with those dimensions are appropriately aggregated for every possible permutation of all of the dimensions. For example, one row can include the dimensions of segment 1, test group 1, category 1, report group 1, and the aggregate results that meet these dimensions. The next row may include the dimensions of segment 1, category 1, test group 1, report group 2, and the aggregate results that meet these dimensions.

When performing the data aggregation operation, all possible permutations of dimensions are preferably determined. Then, the results of clients meeting these dimensions should be matched to these permutations.

For example, FIG. 12 is a diagram illustrating an example of a row of data having a dimensions part and metrics part, according to an embodiment of the present invention. Referring now to FIG. 12, each row includes the dimensions of observation time, performance time, segment, test group, category and report group. Preferably, a row is created for each possible permutation of the dimensions. The metrics of delinquency, % credit line used, value and profit are then matched to the various permutations of the dimensions. Generally, the metrics for a specific row should indicate the consolidation all the individual client data of all the individual clients meeting the values of the dimensions identifying that row. Therefore, the data for each specific client is not being reviewed, but instead the performance of a specific strategy is being reviewed.

The use of time dimensions, such as the dimensions of observation time and performance time, allows the movement between categories to be examined over time. Additionally, time allows for trend analysis and selective inclusion of performance points to assess when a strategy performed well/poorly.

Preferably, look-up tables are used for each of the dimensions, to appropriately and descriptively access the data, and to allow a system user to easily change strategy aggregation parameters which are subsequently reflected in the look-up tables.

For example, FIG. 13 is a diagram illustrating a look-up table for the test group dimension in the row illustrated in FIG. 12, according to an embodiment of the present invention. Referring now to FIG. 13, the look-up table includes a date column (DATE), a test group identifier column (TEST), and a description column (DESCRIPTION). A look-up table could be created for each of the dimensions of the row illustrated in FIG. 12. Moreover, a system user can define T1, T2, T3, . . . , and can add and delete tests as desired. Such changes can be made, for example, through a simple user interface, such as a graphical user interface. Therefore, changes can be instantly made in the values of the dimensions and in response to user changes in strategy or policy.

Thus, the rows of data can be considered to be a data structure which is accessed to track the performance of a category or the dimension.

Therefore, the data aggregation operation of FIG. 11 prepares and correlates data, translating it into a multi-dimensional data model, to support the use of OLAP technology. Then, OLAP technology can be applied to evaluate the aggregated data. OLAP is a well-known term in the art. Generally, OLAP is a known technology that allows for the multi-dimensional analysis of data such that results can be reported in a manner consistent with explaining their significance or inter-relationships. OLAP is based upon the use of multi-dimensional data structures and aggregated data to ensure acceptable performance in leveraging technology. OLAP is in contrast to on-line transactional processing (OLTP) in that OLAP focuses on supporting analysis versus the support of operational systems.

With OLAP, the concepts of "continuous" and "discrete" dimensions are known. Generally, with a discrete dimension, every value of that dimension has its own discrete value. For example, report groups A, B and C are discrete values of the report group dimension. By contrast, with a continuous dimension, there are a near infinite number of values of the element constituting the dimension. For example, there may be an infinite number of values of a balance dimension, since a balance may be virtually any amount. Usually, ranges are used with continuous dimensions so that the dimensions appear more discrete, thereby allowing the data to be managed effectively. For example, the balance dimension may be grouped into first and second ranges, where the first range includes balances greater than zero and less than or equal to $1,000, and the second range includes balances greater than $1,000 and less than or equal to $5,000.

With the present invention, a user of the decision management system can change the actual discrete values of a discrete dimension as appropriate for supporting their strategy or policy. For example, assume that the report groups A, B and C of the report group dimension are defined in the month of January 1998. Then, in February 1998, the user can eliminate the report group A, and add report group D, so that there are now only report groups B, C and D. As a result, for a given time interval, a discrete value of the dimension has changed. The data can then be re-aggregated for these new discrete values by the data aggregation operation in FIG. 11, taking into consideration the time period of validity of each value.

Similarly, with the present invention, a user of the decision management system can change the ranges of a continuous dimension. For example, assume that the ranges of 0–200, greater than 200 and less than 300, and greater than 300 and less than 500 of the continuous balance dimension are defined in the month of January 1998. Then, in February 1998, the user changes the ranges to be 0–300, and greater than 300 and less than 500. As a result, for a given time interval, the ranges of a continuous dimension have changed. The data can then be re-aggregated for these new ranges by the data aggregation operation in FIG. 11, taking into consideration the time period of validity of each range.

Therefore, the present invention allows discrete values of a discrete dimension, and ranges of a continuous dimension, to be changed. Such changes can be made because the present invention allows the values and ranges to be time sensitive. In other words, the values and ranges are effectively provided with dates indicating time periods of validity for the values and ranges. Thus, different values of a discrete dimension can have different periods of validity. Similarly, different ranges of a continuous range can have different periods of validity. Thus, the values and ranges can be considered to be "date stamped". Because of such date stamping, the data aggregation operation in FIG. 11, in preparation for using OLAP technology, can effectively aggregate data into the various permutations of dimensions for different time periods. This allows the strategy analyst to change policy or strategy at will and/or alter the manner in which effectiveness reporting is presented.

For example, regarding discrete dimensions, in step 210 of the data aggregation operation in FIG. 11, as observation points are determined, the system searches for new discrete values of each discrete dimension. If a new discrete value is identified that does not already exist (such as a new report group, or path, in the report group dimension), the system stores the new discrete value and also provides the new value with a date stamp determined by the date on which the observation occurred so that the system knows over which time period the new value will apply. For example, the report group dimension may have the report groups A, B and C in the month of January. By contrast, in February, the report group dimension may have the report groups B, C and D. Report group A can be date stamped as valid for only January. Report groups B and C can be date stamped as valid for January and February. Report group D can be date stamped as valid for only February. Then, the data aggregation operation in FIG. 11, in preparation for using OLAP technology, can appropriately aggregate the data for the various permutations of dimensions in accordance with the data stamped values of the report group dimension.

Moreover, for example, regarding continuous dimensions, in step 230 in FIG. 11, the system retrieves the ranges for each continuous dimension, and appropriately aggregates the data in accordance with the ranges and the dates associated with the ranges.

Date stamping values and ranges can easily be performed by a system user through look-up tables and graphical user interfaces. More specifically, the system user can assign date stamps via a graphical user interface. This input data is then stored in an appropriate memory location. The decision engine (that is, a processing device applying the various strategies and rules) or a processor can then retrieve this data from the appropriate memory locations.

Therefore, by date stamping the discrete values and ranges and in preparation for using OLAP technology to aggregate data, the present invention allows a system user to change the discrete values of a discrete dimension or the ranges of a continuous range "on the fly". Such changes can be made, for example, via a graphical user interface, instead of requiring a software programmer to create or modify the written software code to make the changes.

Conventionally, OLAP technology has not been used to allow "on the fly" changes in discrete values of discrete dimensions or in ranges of continuous dimensions. Generally, this is because OLAP technology is conventionally used in "static" environments that do not require changes in the dimensions. For example, conventionally, OLAP technology might have been used to track customer purchases of a large retail store. Such tracking may require sales data to be tracked over different geographic regions. Here, each geographic region represents a different discrete value of a discrete dimension. These geographic regions do not change often, so that frequent changes in the discrete values of a dimension are not required. Instead, conventionally, whenever a change is required, new software code has to be written to make a hard coded change and/or explicit change in the structure.

In contrast to such conventional use of OLAP technology in a "static" environment, the present invention applies OLAP technology to the much more "dynamic" environment of a rules based decision management system, where discrete values and ranges can be changed "on the fly" without requiring new software code to be written.

Moreover, changes in discrete values of discrete dimensions and in ranges of continuous dimensions are not handled well by the conventional use of OLAP technology since, for example, it is not conventional to date stamp the discrete values and ranges. As a result, as discussed above, in a conventional system using OLAP technology, a system user would typically have to discuss any discrete value and range changes with a software programmer. Then, the software programmer would have to write new software code to hard code the system so that the changed values or ranges can be appropriately managed.

Moreover, according to the above embodiments of the present invention, a system user can change the content and format of data sent to the data aggregation operation in FIG. 11 from the decision engine. For example, a system user can track as a metric the number of people that are more than two cycles delinquent. To do this, the system user can simply add a metric of the number of cycles delinquent to an observation point, without making hard coding changes. Such a change can easily be made through a user interface, such as a graphical user interface (GUI). The use of a flexible data mapping facility makes this possible in that the user defines the layout of the data being sent to data aggregation.

For example, assume two different balances, Balance 1 and Balance 2. For reporting purposes, there may be only one balance dimension. For example, assume the average balance will be reported for all persons in a specific geographic area. With the present invention, the system user can change the reporting results off of Balance 1 or Balance 2, without making hard coding changes. For example, assume that Balance 1 equals the end of the month balance, and Balance 2 equals the balance at the time an invoice is printed. The amount of Balance 1 and Balance 2 may or may not be the same, but the system user may decide to see the results grouped in accordance with Balance 2 instead of Balance 1. In this case, the system would use Balance 2 instead of Balance 1 to compute the average balance, without requiring hard coded changes. The user simply selects the desired balance using a GUI for the decision management system.

Therefore, according to the above embodiments of the present invention, a rules based decision management system applies strategies to produce results. Online analytical processing (OLAP) technology is then applied to the results to evaluate the applied strategies. The applied strategies are then refined in accordance with the evaluated strategies.

Here, a rules based decision management system is a system which applies rules to data to determine appropriate actions to be taken. The rules are changeable so that different strategies can be applied and refined to improve results. The concept of a rules based decision management system is known.

Moreover, according to the above embodiments of the present invention, as described above, the use of date stamping allows the values of a discrete dimension, and ranges of a continuous dimension, to be changed without technical intervention. This allows OLAP technology to aggregate strategy results over time even when the dimensional values change, taking into consideration the changed values and ranges.

Here, the change of values or ranges "without technical intervention" indicates that the changes can be made without changes to the software's code or environment in which it operates that would require a technical understanding of the system's architecture or leveraged technology. In other words, new software code does not have to be written to make the changes. Instead, the changes are driven by the system user through the use of tables, rules and parameters, such as changes which could be made, for example, to FIG. 13 by a system user. This allows a system user to change values and ranges via, for example, a simple graphical user interface or other type of user interface, instead of requiring a software programmer to create or change the written software code or physically move archived data structures. More specifically, this allows a business user to alter policy and how the policy/strategy is measured at will in a timely manner and without technical intervention.

Moreover, according to the above embodiments of the present invention, dimensions can be correlated to observation points. Then, strategy results can be aggregated over time in accordance with the observation point and the correlated dimensions. The data aggregation is performed so that the correlation of dimensions to the observation point over different periods of time are changeable without technical intervention. Such changing of the correlation is accomplished by effectively "date stamping" the correlation. The data aggregation process can then use this date stamping to determine which correlations of dimensions to the observation point are valid for which periods of time.

The aggregated data can be used to determine the effectiveness of various strategies. For example, in the above-described manner, various strategies can be tested to determine whether the strategies are successful in moving clients to more desirable categories.

Regarding the use of decision trees in a decision management system, decision trees should preferably have the same structure for each test group, but could have different actions or decisions associated with each node. Then, a report group, because the tree structures are identical, can allow two or more identical paths to be associated with each other, independent of the test group. For example, instead of simply comparing the overall performance of test group 1 to test group 2, the same path in test group 1 can be compared to the same path in test group 2. This allows microanalysis of the strategy test cells, to determine which paths are performing very well or very poorly.

According to the above embodiments of the present invention, clients can be randomly assigned to a test group. Each test group has associated with it one or more strategies typically defined using decision trees. Each possible path through a decision tree can be "tagged" and the performance of all clients that went down that path can be monitored.

Report groups and categories can be considered to be different types of "tags." Report groups are preferable to tag paths in a single function set and provide measurement of just that path across all test groups/trees used in the respective function set. Categories provide similar functionality as report groups, but at an aggregate level. More specifically, the performance of a category is tracked as the cumulative performance of report groups assigned in strategy paths that were traversed after the assignment of the category.

Report groups define unique paths through a strategy and span test groups such that performance of path A in test group 1 can be compared with path A in test group 2. The rules associated with a given path should preferably be the same across two test groups, but the decisions assigned at the end of the path may vary by test group. As a result, the strategy experimentation function can be accelerated by not simply comparing two or more test groups to determine the best performer, but rather by measuring individual paths across two or more test groups such that a new hybrid strategy can be developed using the best performing paths of each test group.

As an example, assume that the following function sets will be executed in order: CATEGORY ASSIGNMENT, APPROVE/DECLINE DECISION, and CREDIT LIMIT ASSIGNMENT. In CATEGORY ASSIGNMENT, there are three paths used to segment customers into three categories: HIGH RISK, MEDIUM RISK and LOW RISK. Two test groups are then defined: TRADITIONAL (70%) and AGGRESSIVE (30%). The CATEGORY ASSIGNMENT tree is the same for both test groups since categories span test groups and vice-versa (i.e., a many to many relationship). However, the trees associated with the APPROVE/DECLINE and CREDIT LIMIT ASSIGNMENT function sets will have different decisions, depending on the test group.

For APPROVE/DECLINE, there are three paths through the decision tree, defined by report groups A, B and C. Similarly, there are three paths through the decision tree for CREDIT LIMIT ASSIGNMENT, defined by report groups D, E and F.

FIGS. 14(A), 14(B), 14(C) and 14(D) are diagrams illustrating the operation of a decision management system as applied to CREDIT LINE ASSIGNMENT, according to an embodiment of the present invention.

Referring now to FIGS. 14(A) and 14(B), as described above, 70% of customers are assigned to the test group TRADITIONAL, and 30% of customers are assigned to the test group AGGRESSIVE. Each test group has the same decision tree structure. There are three paths through the decision tree for CREDIT LIMIT ASSIGNMENT, defined by report groups D, E and F.

A decision management system according to the embodiment of the present invention provides the ability to measure the performance of each report group across test groups. For example, while at an aggregate level, assume that TRADITIONAL produced more profit than AGGRESSIVE. However, assume that the path/decision associated with report groups D and F in AGGRESSIVE generated more profit than the same path/decisions associated with report groups D and F in TRADITIONAL, as indicated by the "check mark" in FIG. 14(B) next to report groups D and F.

However, assume that report group E in TRADITIONAL was more profitable than the comparable paths/decision in AGGRESSIVE, as indicated by the "check mark" in FIG. 14(A) next to report group E. Rather than simply increasing the percentage of people assigned to TRADITIONAL, a new hybrid strategy can be defined and associated with a test group that uses the decision assigned for report groups D and F in AGGRESSIVE in conjunction with the decision assigned to report group E in TRADITIONAL. This new test group will be called, for example, TRADITIONAL_2. The overall profitability of TRADITIONAL_2 will be higher than either TRADITIONAL and AGGRESSIVE since it contains the best performing paths/decisions of each test group for the CREDIT LINE ASSIGNMENT function set. A similar procedure would be performed within APPROVE/ DECLINE using report groups A, B and C, to develop an improved hybrid strategy for APPROVE/DECLINE.

To continue the example and relate it to categories, the performance of TRADITIONAL can be examined over time in moving more people into the LOW RISK category from the HIGH RISK category. This can be compared to the effectiveness of AGGRESSIVE at achieving the same objective (i.e., over time, moving more people into the LOW RISK category).

For example, FIGS. 14(C) and 14(D) each represent a matrix having the categories of HIGH RISK, MEDIUM RISK and LOW RISK on one axis, and the test groups TRADITIONAL and AGGRESSIVE on the other axis. Thus, these matrices have the same axes and values on the axes as the matrix in step 165 of FIG. 8. However, the matrix in step 165 in FIG. 8 is used to allocate customers to strategy test cells, whereas the matrix in FIGS. 14(C) and 14(D) are used to leverage performance metrics for each strategy test cell. More specifically, the matrices in FIGS. 14(C) and 14(D) are for viewing the movement of clients between categories. By contrast, the matrix in step 165 of FIG. 8 is for actual strategy execution versus strategy reporting.

As an example, assume that FIG. 14(C) represents a matrix based on data for January 1997, while FIG. 14(D) represents a matrix based on data for December 1997. As can be seen from comparing FIGS. 14(C) and 14(D), both test groups were effective in moving customers from the HIGH RISK category into the MEDIUM RISK and LOW RISK categories. Therefore, the company might consider permanently implementing these test group strategies. Moreover, hybrid strategies can be developed from test groups in the same category and possibly across categories. In this manner, strategies can be tested and implemented to move customers appropriately into different categories.

The effectiveness measurement of the categories is a direct function of aggregating the performance associated with the report groups assigned to the clients for the APPROVE DECLINE and/or CREDIT LIMIT ASSIGNMENT function sets.

The various processes, procedures, methods and operations described herein are preferably embodied in software, which can be run on many different hardware configurations.

Figure 15:
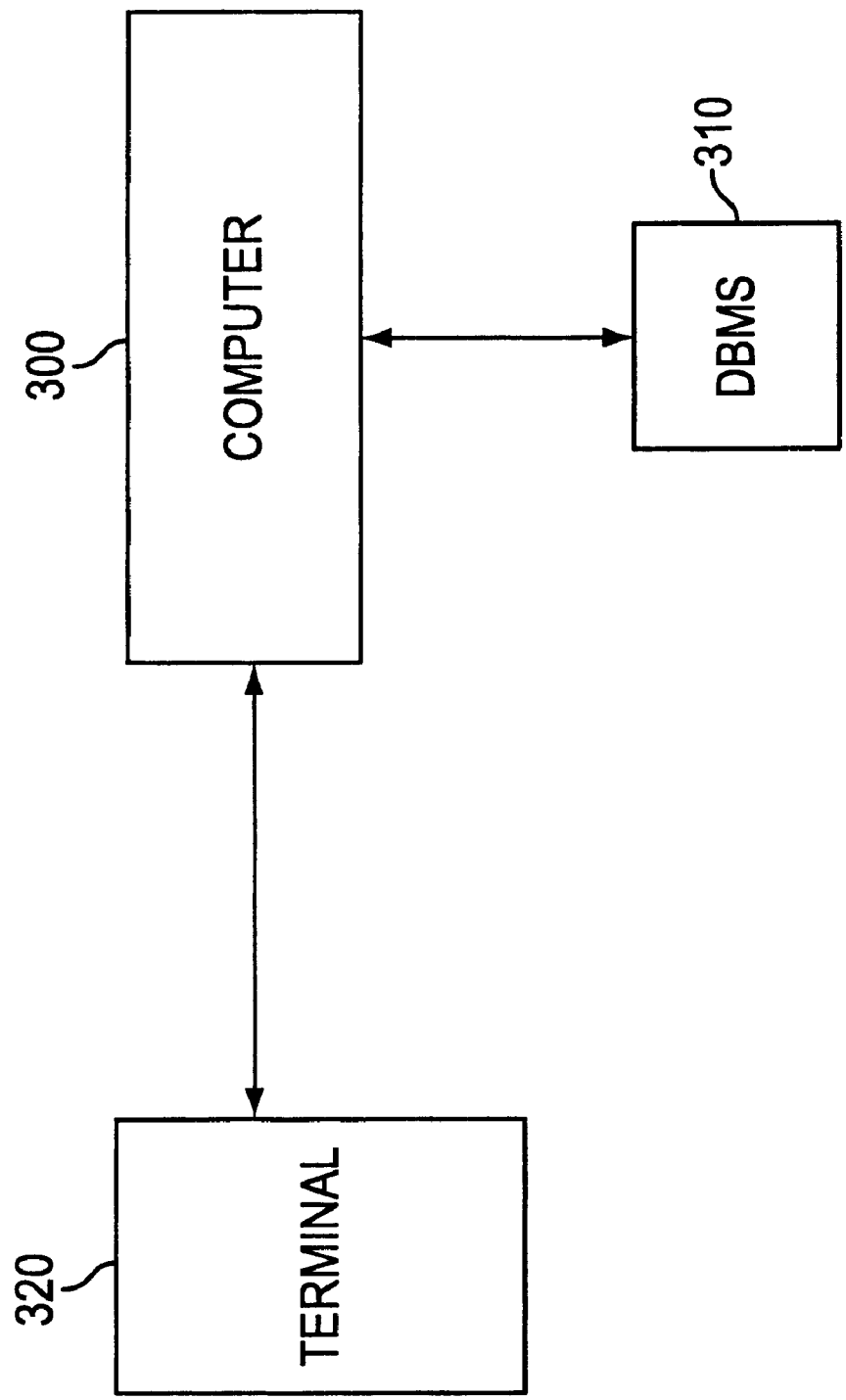
FIG. 15 is a diagram illustrating a simplified hardware architecture of a decision management system, according to an embodiment of the present invention.

FIG. 15 is a diagram illustrating a simplified hardware architecture of a decision management system, according to an embodiment of the present invention. Referring now to FIG. 15, the decision management system is embodied in software stored in a computer-readable medium, such as a memory of a computer 300. Computer 300 can be, for example, a server and associated memory. Computer 300 preferably has access to a data base management system (DBMS) 310 for storing and accessing accumulated data. A user accesses computer 300 possibly via a terminal 320 which can be, for example, a PC. There are many different types of hardware configurations, including many different types of client/server architectures, which can be used. Such hardware configurations would be understood by a person of skill in the art.

Figure 16:
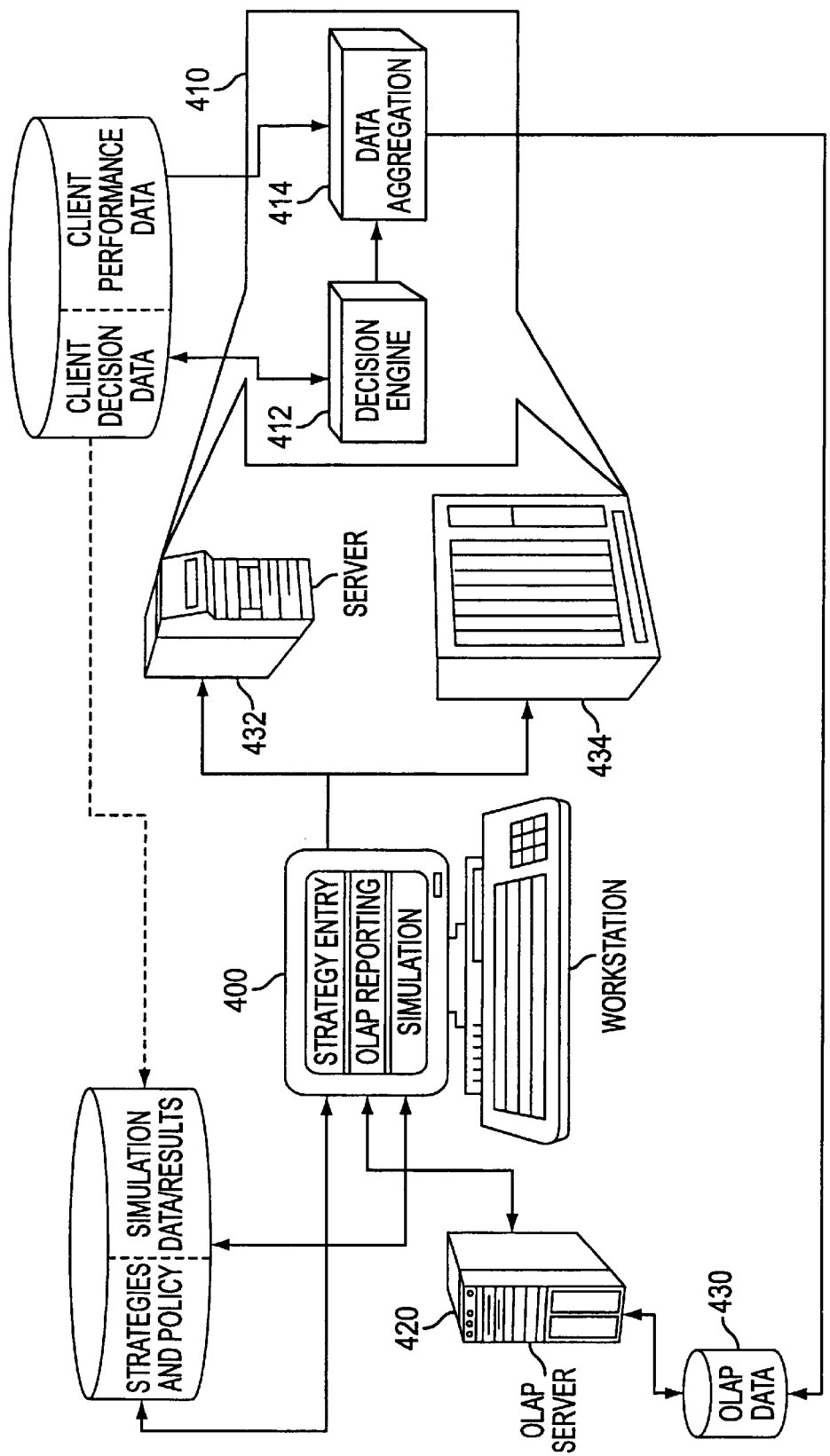
FIG. 16 is a diagram illustrating a more detailed hardware architecture of a decision management system, including the distribution of the system software, according to an embodiment of the present invention.

FIG. 16 is a diagram illustrating a more detailed hardware architecture of a decision management system, according to an embodiment of the present invention. Referring now to FIG. 16, a workstation 400 provides a centralized user interface through which a strategy analyst can control the system. The primary purpose of workstation 400 is to enable the entry, maintenance and propagation of decision strategies to a decision engine/data aggregation platform 410 which includes a decision engine 412 and a data aggregation component 414. A server 432 and a mainframe 434 typically run different processing modes, and provide the processing power for decision engine/data aggregation platform 410. Workstation 400 also provides access to OLAP analysis and reporting systems, possibly via an OLAP server 420 and OLAP database 430.

Decision engine 412 deploys the business decisioning rules entered on workstation 400 against client data. This architecture is highly scaleable and can operate in both on-request or batch processing modes as well as in both mainframe and client/server environments.

Potentially sharing the same environments as decision engine 412 is data aggregation component 414. Data aggregation component 414 is responsible for matching/merging decision engine output (i.e., scores and decisions stored as observation points/data) with the results of enacting recommendations (i.e., performance points/data) of decision engine 412. Data aggregation component 414 provides the information that OLAP server 420 accesses to provide strategy performance.

The OLAP portion of the system preferably uses a one to four tier architecture to allow a strategy analyst to do multidimensional analysis on the results of deployed strategies. The OLAP portion of the system can be extremely scaleable through leveraging the following configurations: data resides locally with a graphical reporting user interface (1 tier), data resides independently from the graphical reporting user interface (2 tiers), a server resides between the user interface and the data to expedite query requests and monitor strategy results (3 tiers) and/or a web server resides between the user interface and the OLAP server to enable mass browser-based distribution of reports (4 tiers). OLAP's multidimensional qualities provides analysts with the flexibility to "mine" their results, examining relationships in the data as well as the ability to perform ad hoc calculations and re-format views as required.

A decision management system is described above as being embodied, for example, in software stored in a computer-readable medium, such as a memory of a computer. However, a computer-readable medium is not intended to be limited to a memory of a computer. Instead, a computer-readable medium can be, for example, a computer disk, an optical disk or any other medium which is readable by a computer.

The test groups and categories are not intended to be limited to the specific examples included herein, and instead can be flexibly designed, for example, based on the business of the organization. For example, Bronze, Gold and Platinum are described herein as being categories. However, the present invention is not intended to be limited to use with these specific category names. Moreover, the applied strategies are not intended to be limited to any specific decision tree structure described herein as an example.

A decision management system according to the above embodiments of the present invention allows strategies to be developed which move clients of an organization from one category of clients to another. Different strategies are applied to clients within different strategy test cells. Then, the movement of clients between strategy test cells can be monitored, so that the strategies can be appropriately modified to control the movement of clients between categories.

The present invention is not intended to be limited to controlling the movement of clients across categories, and movement is not the only reason to apply strategies. Instead, strategies can be applied, for example, simply to increase the client value over time to the organization. For example, two distinct report groups may result in different delinquency rates for clients of a company. Changing the overall strategy to include the strategy which yields the lower delinquency rate does not necessarily imply movement of a client across client categories. The client may stay, for example, in a "Bronze" category, but the overall effectiveness of the portfolio of clients may have been statistically improved. Therefore, in this example, the client value over time to the company has been increased.

A decision management system according to the above embodiments of the present invention is significantly different and more evolved than the system described in FIGS. 1–7. For example, the system described in FIGS. 1–7 does not create or conceptualize a data structure equivalent to a matrix of categories and test groups, and thereby does not allow different strategies to be applied to different strategy test cells of the matrix. Further, a system as described in FIGS. 1–7 does not track movement of clients between categories, or modify strategies based on the tracked movement to control movement of clients between categories. In addition, a system as described in FIGS. 1–7 has no OLAP capability to perform multidimensional analysis on strategy results and thus explain positive/negative strategy performance across multiple, user-defined dimensions. Therefore, a system as in FIGS. 1–7 cannot provide advantages of the present invention. Instead, it is limited to very tactical analysis.

The above embodiments of the present invention describe an example of the use of OLAP technology with a rules based decision management system. However, the present invention is not intended to be limited to this specific example. For example, the present invention is not intended to be limited to controlling the movement of clients across categories.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer-implemented process comprising:
   applying strategies by a computer-implemented rules based decision management system to determine actions to be taken with respect to clients of an organization, the applied strategies producing results;
   aggregating the results over time in accordance with values of a discrete dimension so that the values are changeable without technical intervention;
   applying online analytical processing (OLAP) technology to evaluate the aggregated results; and
   modifying the applied strategies by the decision management system in accordance with the evaluated results.

2. A process as in claim 1, wherein said aggregating further comprises:
   aggregating the results over time in accordance a continuous dimension so that ranges of the continuous dimension are changeable without technical intervention.

3. A process as in claim 1, wherein the values are date stamped to allow the values to be changed without technical intervention.

4. A process as in claim 1, wherein said aggregating includes:

forming a data structure conceptually representable as rows, each row including a unique combination of dimensions and their respective values relative to the other rows and including data corresponding to accumulated results over time for the combination of dimensions of the row.

5. A computer-implemented process comprising:

applying strategies by a computer-implemented rules based decision management system to determine actions to be taken with respect to clients of an organization, the applied strategies producing results;

aggregating the results over time in accordance a continuous dimension so that ranges of the continuous dimension are changeable without technical intervention;

applying online analytical processing (OLAP) technology to evaluate the aggregated results; and modifying the applied strategies by the decision management system in accordance with the evaluated results.

6. A process as in claim 5, wherein the ranges are date stamped to allow the ranges to be changed without technical intervention.

7. A process as in claim 5, wherein said aggregating includes:

forming a data structure conceptually representable as rows, each row including a unique combination of dimensions and their respective values relative to the other rows and including data corresponding to accumulated results over time for the combination of dimensions of the row.

8. A computer-implemented process comprising:

applying strategies by a computer-implemented rules based decision management system to determine actions to be taken with respect to clients of an organization, the applied strategies producing results;

date stamping values of discrete dimensions to allow the values to be valid for different periods of time;

aggregating the results over time in accordance with the date stamped values;

applying online analytical processing (OLAP) technology to evaluate the aggregated results; and modifying the applied strategies by the decision management system in accordance with the evaluated results.

9. A computer-implemented process comprising:

applying strategies by a computer-implemented decision management system to determine actions to be taken with respect to clients of an organization;

forming a data structure conceptually representable as rows, each row including a unique combination of dimensions and their values relative to the other rows and including data corresponding to accumulated results over time for the combination of dimensions of the row;

applying online analytical processing (OLAP) technology to evaluate the data in the data structure; and modifying the applied strategies by the decision management system in accordance with the evaluated data.

10. A computer-implemented process comprising:

applying strategies by a computer-implemented rules based decision management system to determine actions to be taken with respect to clients of an organization, the applied strategies producing results;

determining an observation point corresponding to a point in time when a strategy decision was made;

correlating dimensions to the observation point;

aggregating the results over time in accordance with the observation point and the correlated dimensions, the correlation of dimensions to the observation point over different periods of time being changeable without technical intervention;

applying online analytical processing (OLAP) technology to evaluate the aggregated results; and modifying the applied strategies by the decision management system in accordance with the evaluated results.

11. A process as in claim 10, wherein, in preparation for said applying OLAP technology, the process further comprises:

date stamping the correlation of dimensions to the observation point, so that the correlation of dimensions to the observation point are changeable without technical intervention.

12. A process as in claim 11, further comprising, before the results are aggregated:

formatting the results without technical intervention, to place the results in a format for aggregating by said aggregating.

13. A computer-implemented process comprising:

applying strategies by a computer-implemented rules based decision management system to determine actions to be taken with respect to clients of an organization, the applied strategies producing results;

determining an observation point corresponding to a point in time when a strategy decision was made;

correlating dimensions to the observation point;

aggregating the results in accordance with the observation point and the correlated dimensions;

changing the correlation of dimensions to the observation point;

aggregating the results in accordance with the observation point having the changed, correlated dimensions;

applying online analytical processing (OLAP) technology to said results aggregated in accordance with the observation point have the changed, correlated dimensions, to evaluate said results; and modifying the applied strategies by the decision management system in accordance with the evaluated results.

14. A process as in claim 13, wherein, in preparation for said applying OLAP technology, the process further comprises:

date stamping the correlation of dimensions to the observation point, so that the correlation of dimensions to the observation point are changeable without technical intervention.

15. A computer-implemented process comprising:

applying strategies by a computer-implemented rules based decision management system to determine actions to be taken with respect to clients of an organization, the applied strategies producing results;

aggregating the results over time;

applying online analytical processing (OLAP) technology to evaluate the aggregated results; and modifying the applied strategies by the decision management system in accordance with the evaluated results.

16. A process as in claim 15, wherein said aggregating comprises:

aggregating the results over time in accordance with values of a discrete dimension so that the values are changeable without technical intervention.

17. A process as in claim 15, wherein said aggregating comprises:

aggregating the results over time in accordance a continuous dimension so that ranges of the continuous dimension are changeable without technical intervention.

18. A process as in claim 15, further comprising, before the results are aggregated:

formatting the results without technical intervention, to place the results in a format for aggregating by said aggregating.

19. A computer-implemented process comprising:

applying strategies by a computer-implemented decision management system to determine actions to be taken with respect to clients of an organization, the applied strategies producing results;

time stamping initial values of a discrete dimension;

changing a value of the discrete dimension, and time stamping the changed value;

aggregating the results in accordance with the time stamped initial values and the time stamped changed value;

applying online analytical processing (OLAP) technology to evaluate the aggregated results; and refining the applied strategies by the decision management system in accordance with the evaluated results.

20. A computer-implemented process comprising:

applying strategies by a computer-implemented decision management system to determine actions to be taken with respect to clients of an organization, the applied strategies producing results;

time stamping initial ranges of a continuous dimension;

changing a range of the continuous dimension, and time stamping the changed range;

aggregating the results in accordance with the time stamped initial ranges and the time stamped changed range;

applying online analytical processing (OLAP) technology to evaluate the aggregated results; and modifying the applied strategies by the decision management system in accordance with the evaluated results.

* * * * *

UNITED STATES PATENT AND TRADEMARK OFFICE
CERTIFICATE OF CORRECTION

PATENT NO. : 6,430,545 B1
DATED : August 6, 2002
INVENTOR(S) : Laurence Honarvar et al.

It is certified that error appears in the above-identified patent and that said Letters Patent is hereby corrected as shown below:

Column 16,
Line 65, change "defme" to -- define --.

Column 22,
Line 19, change "11" to -- 10 --.

Signed and Sealed this

Twenty-ninth Day of October, 2002

Attest:

Attesting Officer

JAMES E. ROGAN
Director of the United States Patent and Trademark Office